United States Patent Office 3,586,657
Patented June 22, 1971

3,586,657
STABILIZED CRYSTALLINE PROPYLENE
POLYMERS
John A. Casey, Pepper Pike, Ohio, assignor to Standard Oil Company, Chicago, Ill.
No Drawing. Continuation of application Ser. No. 802,304, Jan. 23, 1969, which is a continuation of application Ser. No. 403,354, Oct. 12, 1964, which is a continuation-in-part of application Ser. No. 46,094, July 29, 1960, which in turn is a continuation-in-part of application Ser. No. 791,251, Feb. 5, 1959, now Patent No. 3,496,128. This application Oct. 30, 1969, Ser. No. 871,775
Int. Cl. C08f 45/58
U.S. Cl. 260—45.95
6 Claims

ABSTRACT OF THE DISCLOSURE

Tris phenols are superior stabilizers against melt flow index increases for crystalline polypropylene when being processed and subjected to elevated temperatures and mechanical shear.

---

This application is a continuation of application Ser. No. 802,304 filed Jan. 23, 1969, now abandoned, which in turn is a continuation-in-part of application Ser. No. 403,354 filed Oct. 12, 1964, now abandoned, which in turn is a continuation-in-part of application Ser. No. 46,094 filed July 29, 1960, now abandoned, which in turn is a continuation-in-part of application Ser. No. 791,251, Feb. 5, 1959, now U.S. Pat. No. 3,496,128.

This invention relates to the stabilization of solid, substantially crystalline, high molecular weight propylene polymers, and more particularly to new compositions of matter comprising said solid polymers and an inhibitor therefor, as well as a novel process which results in stabilized shaped articles of said polymers.

Polymers which are included in the compositions of this invention are the relatively high molecular weight solid crystalline polymers of propylene. These polymers may be homopolymers or block copolymers. With regard to such block copolymers and their preparation, see for example, Church application Ser. No. 700,761 filed Dec. 15, 1957, Schneider et al. application Ser. No. 424,819 filed Jan. 11, 1965, and Khelghatian et al. application Ser. No. 244,281 filed Dec. 13, 1962, now abandoned, a continuation-in-part application of which issued as U.S. Pat. 3,442,978, which applications and patent are incorporated herein by reference.

Such polymers can be prepared by the polymerization of the olefin, or olefins, using a solid catalytic material. A catalyst which is especially effective for the polymerization of propylene to relatively high molecular weight solid polymers is the combination of a lower halide of titanium, such as titanium trichloride, and an aluminum compound having the formula $R_1R_2R_3Al$ wherein $R_1$ is hydrocarbon and each of $R_2$ and $R_3$ are the same or different hydrocarbon or halogen groups, such as aluminum triethyl, diethyl aluminum chloride or ethyl aluminum dichloride. This type of catalyst can be prepared by admixing, for example, titanium tetrachloride and aluminum triethyl in an inert solvent, such as isooctane or other hydrocarbons. This mixture acts as a catalyst for polymerizing the alpha-olefin to solid polymers. If desired, a lower halide such as titanium trichloride can be preformed, dispersed in an inert liquid, and an activator, such as one of the foregoing aluminum compounds, added. The polymerization process comprises contacting propylene with the solid catalyst, such as by passing the olefin into the liquid reaction mixture thereby to polymerize said olefin to solid polymers.

Anhydrous and oxygen-free conditions are used throughout the process, since the catalyst is deactivated by contact with water or oxygen.

In addition to the foregoing, the following patents, incorporated herein by reference, illustrate block copolymer processes and catalysts suitable for the preparation of the propylene block copolymers contemplated by the present application, U.S. Pat. 3,268,624 and U.S. Pat. 3,296,338. Other specific catalyst systems, i.e. other metal halide or metal oxide catalyst systems, as well as other process conditions, necessary for the preparation of the polypropylene described herein are illustrated by pages 350 through 361, pages 416 through 419, page 452 and page 453 of "Linear and Stereo-Regular Addition Polymers" by Norman G. Gaylord and Herman F. Mark, Interscience Publishers, 1959, the contents of which are incorporated herein by reference.

Propylene homopolymers and block copolymers as above-described have a crystalline melting point of from 160° C. to 170° C., a tensile strength of from 3,000 to 6,000 p.s.i. (pounds per square inch), and an average molecular weight of from 50,000 to 850,000 or more (determined by light-scattering). Usually, a mixture of crystalline and amorphous polymer is obtained. If desired, amorphous polymer can be separated from the crystalline polymer by contacting a mixture thereof with a hydrocarbon solvent, such as isooctane or n-heptane, at an elevated temperature. The amorphous polymer is substantially soluble under these conditions whereas the crystalline polymer is substantially insoluble. The compositions of the present invention are prepared from either crystalline or mixtures of crystalline with amorphous polymers in which the mixture contains at least 25% by weight, and preferably at least 50% by weight, of the crystalline polymer. In addition to the foregoing characteristics, the block copolymers contemplated by this invention, as aforesaid, have improved impact strength even at low temperatures.

Such polymers may be molded or otherwise fabricated to form many useful articles. However, propylene polymers are susceptible to degradation caused by heat, oxidation, mechanical working, and light (especially ultraviolet light). This degradation apparently results from free-radical formation within the polymer molecules, which formation is promoted by oxygen, heat, mechanical action, impurities (such as metals and metal compounds), and light. The free-radicals which are formed undergo chemical reaction with the polymer itself, resulting in undesirable chemical and physical transformations. Thus, the propylene polymers deteriorate prematurely, lose tensile strength and other desirable properties such as pliability and impact strength, and become discolored and embrittled.

An object of the present invention is to provide compositions comprising the above-described solid, crystalline homopolymers and solid, crystalline block copolymers of propylene containing a minor, but stabilizing quantity, of a material effective to inhibit degradation of said polymers. It is a specific object of this invention to provide compositions comprising the above-described polymers containing minor quantities of a tabilizing material effective to substantially prevent degradation of the polymer caused by exposure to elevated temperature, oxygen and mechanical shear. It is another object of this invention to provide a process for the formation of shaped articles derived from the aforesaid polymers which are stabilized against degradation resulting from the aforesaid causes.

In accordance with the present invention, it has been found that remarkably stable polymer compositions may be prepared by admixing with the aforesaid substantially crystalline, solid, propylene polymer a stabilizing quantity of a tris-phenol having the formula:

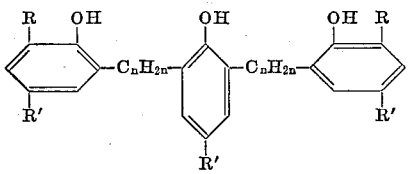

wherein $n$ is 0 to 8, R is a tertiary alkyl group containing 4 to about 16 carbon atoms, and R' is a non-tertiary alkyl group containing 1 to about 16 carbon atoms (i.e. primary, secondary or iso-alkyl groups). For example, suitable compounds which are useful according to this invention include 2,6-bis-(2-hydroxy-3-t-butyl-5-methylbenzyl)-4-methylphenol,
2,6-bis-(2-hydroxy-3-t-amyl-5-ethylbenzyl)-4-n-propylphenol,
2,6-bis-(2-hydroxy-3-t-octyl-5-isopropylbenzyl)-4-isopropylphenol,
2,6-bis-(4-hydroxy-3-tertiarybutyl-5-n-octyl-benzyl)-4-n-octylphenol,
2,6-bis-(2-hydroxy-3-t-butyl-alpha,5-dimethylbenzyl)-p-cresol (i.e. the hydrocarbon bridges are ethylidene groups), 2,6-bis-(2-hydroxy-3-tertiarbutyl-alpha,alpha,5-trimethylbenzyl)-p-cresol,
2,6-bis-(hydroxy-3-tertiarybutyl-5-sec.butylbenzyl)-4-sec.butylphenol,
2,6-bis-(2-hydroxy-3-tertiaryoctyl-5-n-butyl-alpha,alpha-dimethylbenzyl)-4-n-butylphenol,
2,6-bis-(2-hydroxy-3-tertiarybutyl-5-ethylbenzyl)-4-methylphenol,
2,6-bis-(2-hydroxy-3-tertiarybutyl-5-n-propylbenzyl)-4-methylphenol, and the like.

The present invention is described herein in terms of certain preferred embodiments; however, it covers equivalent procedures, materials and quantities. Broadly it is required that a stabilizing quantity be used, i.e. a quantity of the stabilizer sufficient to impart stability to the propylene polymers of this invention. Thus, the quantity to be used will make itself apparent to those skilled in the art depending upon the circumstances under which the stabilized polymer is to be used. Although greater or lesser quantities can be used, it is generally necessary that from about 0.01% to about 5% by weight of the stabilizer be used with the polypropylene, a quantity of from about 0.05% to about 2% by weight of the stabilizer being preferred.

By using a stabilizing quantity of the tris-phenol of this invention in combination with the polypropylene described herein, remarkable stability is imparted thereto against degradation by heat and oxidation, that caused by mechanical action, such as extrusion, and that made apparent by way of discoloration of the polymer. Thus, stability is imparted to the polymer during fabrication techniques wherein high temperatures are used, as well as during use of so-formed shaped articles in the presence of heat or oxygen.

It is known that the melt index of non-stabilized polyethylene, as well as its melt index ratio, decrease drastically when it is subjected to elevated temperature and mechanical shear; see, for example, Australian Pat. 201,160, Jan. 11, 1956. Data herein illustrate that quite unexpectedly both the melt index and the melt index ratio of the non-stabilized propylene polymers described herein increase drastically when it is subjected to elevated temperature and mechanical shear. Thus, whereas elevated temperature and mechanical shear cause chain fission in polypropylene, such conditions appear to cause cross-linking in polyethylene. In addition, numerous other compounds known as stabilizers for other polymers are shown hereinbelow to be entirely ineffective in the polymers of this invention. It is clear then that the probable mechanism by which the polymers known heretofore degrade is entirely different from the mechanism by which polymers of this invention degrade. Accordingly, the mechanism by which polymers of this invention are stabilized is unrelated to that by which said other polymers are stabilized.

The stabilizer may be combined with the propylene polymer by any method suitable for the preparation of homogeneous mixtures. For example, the polymer may be melted and the stabilizer admixed therewith by milling on heated rolls, by using a Banbury mixer, by using a melt-extrusion device or other device wherein melting and mixing are accomplished. Alternatively, the stabilizer may be combined, in a solid or molten state, with a solution or suspension of the polymer in a suitable liquid. In another process, one dissolves the stabilizer in a suitable solvent, admixes powdered polymer therewith, and evaporates the solvent. In another mode of operation, the solid stabilizer is thoroughly dry-mixed with the solid polymer. In general, it is preferable that the mixing process be carried out in an inert atmosphere, or under vacuum, in order to prevent oxidation of the polymer.

As indicated above, it is an object of this invention to provide a process for the formation of shaped articles derived from the polymers of this invention, which shaped articles are stabilized against degradation resulting from heat or light. Said process involves intimately mixing the polymer with the stabilizer to provide a homogeneous mixture thereof, heating said mixture sufficiently to melt the polymer and forming shaped articles from said melt. The mixing step may be entirely separate from the melting step, or these steps may be performed simultaneously. In a preferred embodiment the polymer and the stabilizer are mixed prior to melting; however, to insure a homogeneous mixture mixing is continued during the melting step. For example, this preferred procedure can be performed in a conventional melt extruder by introducing a premixed polymer-stabilizer composition thereinto. The shaped articles contemplated by this invention include films, fibers, pellets and other shapes fabricated by conventional melt-extrusion, injection-molding, thermoforming, blow-molding, compression-molding, transfer-molding, powder-molding, or casting techniques.

Several criteria are used to determine the effectiveness of the stabilizers in the compositions of this invention. Since unstabilized polypropylene is normally drastically degraded during formation into articles of manufacture, e.g. by extrusion, molding, rolling, etc., the extent of this degradation is measured. One method of determining the extent of degradation is by observing the change in melt index of the polymer upon working of the same at elevated temperature. Melt index is a measure of melt viscosity, and is the rate, in grams per 10 minutes, at which the composition being tested is extruded through an orifice 0.0823 inch in diameter from a barrel 0.3760 inch in diameter under the force of a piston weighing 2160 grams, the composition being maintained at 230° C. (446° F.) during the extrusion. The initial melt index is determined by loading the cylinder with the composition to be tested, applying the stated piston pressure, and heating for 5 minutes. Any extrudate produced during this 5-minute period is cut off, and the extrudate for the next 6 minutes is measured. The amount of this extrudate, converted to grams per 10 minutes (by multiplying 1⅔) is the initial melt index ($MI_a$). The remainder of the composition being tested is then extruded. This extrudate is combined with that produced in the first 11 minutes, and the combined extrudates are returned to the cylinder. After 10 more minutes at 230° C., the piston is again brought to bear and all the test composition is extruded. The extruded test composition is again returned to the cylinder, held for 10 minutes, and extruded. This extrudate is returned to the cylinder and piston pressure applied immediately. After 4 minutes all extrudate is cut off and discarded, and the extrudate for the next 6 minutes measured. The amount of this extrudate, converted to grams per 10 minutes, is the final melt index ($MI_b$). The stability of a polymer composition is indicated by the ratio of $MI_b$ to $MI_a$, a low ratio indicating a high degree of stability. This ratio should be less than about 4.0 in order for the composition to be adaptable to a wide variety of processing methods, although slightly higher ratios are suitable for many applications.

In addition to the foregoing degradation caused during fabrication, articles made from unstabilized polypropylene are also rapidly degraded and oxidized by exposure to high temperatures during normal use of such articles. Such degradation and oxidation is made apparent by discoloration and by crazing and crumbling of the surface of the molded article. The crazing consists of small surface cracks which, once started, progress quite rapidly until the entire surface of the article is crazed. The crumbling also progresses quite rapidly after it first becomes noticeable; thus, the molded articles become so friable that edges and corners are easily rubbed off with the fingers.

In the examples below, the molded articles used were molded sheets of polypropylene, 3/32" to 1/8" thick. Above 3/32" the thickness of the sheet appears to have little or no effect on the resistance of the polypropylene to heat and oxidation. These sheets were placed in an oven and held at 280° F. until crazing appeared, or until they became friable, as evidenced by breaking a corner or an edge with the fingers. The oven life recorded in the examples is the number of hours at 280° F. before such evidence of degradation and oxidation appeared. An oven life of at least 500 hours is necessary for a polymer composition to be useful in a majority of applications.

Unstabilized polypropylene also becomes badly discolored during exposure to high temperatures. This discoloration does not appear to be directly related to the oxidation and degradation of the surface. Although the basic reason for the discoloration is not known with certainty, it appears that it may be caused by various impurities in the polymer, such as the residue from the polymerization catalyst. It also appears that many stabilizers impart some color to the polymer, even though these stabilizers are effective to reduce degradation and oxidation of the polyolefins. The high temperatures used during fabrication as well as the high temperatures to which the polymer is subjected during various applications thereof, apparently initiate some reaction between the various impurities which results in the formation of the color bodies.

In a color scale which has been devised to compare the colors of polypropylene articles, colors on the scale range from No. 1, which is nearly clear, about like frosted glass, to No. 10, which is a dark, reddish brown, similar to dark mahogany. No. 2 color is slightly tinged with yellow, and No. 4 color has a slight orange tinge. Colors from 1 to 4 are deemed satisfactory for practically all applications of polypropylene, while darker colors limit the use of the polymers to those applications where a dark color is not objectionable.

The following examples, wherein the proportion of stabilizers used indicates the weight percent of the stabilizers based on the weight of the compositions, illustrate the compositions of this invention, the scope of the invention being determined by the scope of the appended claim.

EXAMPLE 1

A 100 gallon reactor was charged with 40 gallons of isooctane, 0.0025 lb./gallon of titanium trichloride and 0.0037 lb./gallon of triethylaluminum. When pressured to 140 p.s.i.g., with propylene, polymerization took place at 157° F. to produce polypropylene at a rate of 0.23 lb./gal./hour. This polymer was 0.45% by weight pentane-soluble, and 4.16% by weight heptane-soluble.

It had a molecular weight of 390,000 by light scattering and a melting point of 168° C. This is Polypropylene A. The foregoing procedure was repeated except that 0.0013 lb./gal. of titanium trichloride, 0.0019 lb./gal. of triethylaluminum, and a temperature of 158° F. were used to give a polymerization rate of 0.1 lb./gal./hour. This is Polypropylene B which, upon dry mixing with Polypropylene A, gave a product having a molecular weight of about 310,000 by light scattering and a melting point of 168° C. Its pentane-soluble portion was 0.59% by weight, its heptane-soluble portion 7.27% by weight, and it was about 55% crystalline.

The foregoing mixture of Polypropylenes A and B was dry-mixed, with vigorous stirring with 0.5% by weight of 2,6-bis-(2-hydroxy-3-tertiarybutyl-5-methylbenzyl)-4-methylphenol. When evaluated by the procedures described hereinabove, the following properties are observed:

| Sample | $MI_a$ | $MI_b/MI_a$ | $MI_a$ color | 280° F. oven life (hours) |
|---|---|---|---|---|
| Control 1 (A+B) | 0.192 | 10.5 | 1 | 1/2 |
| Example 1 (A+B Stabilizer) | 0.039 | 1.8 | 1 | 1,128 |

Thus, the foregoing tris-phenol imparts excellent processing stability as shown by the melt index ratio, excellent color and excellent oven life.

EXAMPLES 2–3

When Example 1 is repeated at the 0.25 and 1.0% levels, the 280° F. oven life exceeds 500 hours.

EXAMPLE 4

When polypropylene prepared in substantially the same manner as in Example 1, and having a molecular weight of 370,000 by light scattering, a crystallinity of 50%, a pentane-soluble portion of 0.87% by weight and a heptane-soluble portion of 2.72% was dry-mixed as in Example 1 with the tris-phenol of Example 1, the following properties are obtained: $MI_a=0.5$, $MI_b/MI_a=2.1$, and 280° F. oven life=>450 hours.

EXAMPLE 5

The polypropylene of Example 4 was stabilized by compounding the same, in the manner described in Example 1, with 0.25 wt. percent of the tris-phenol of Example 1, 0.25 wt. percent of 2,6-ditertiarybutyl-p-cresol and 0.25 wt. percent of an epoxy resin [1] having the formula:

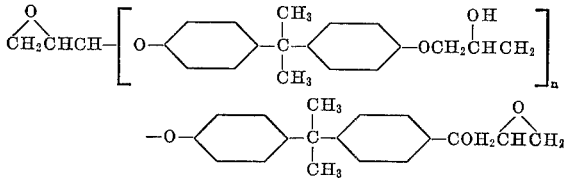

EXAMPLE 6

When the stabilized polypropylene of Example 5 was tested in contact with a brass shim, its 280° F. oven life exceeded 760 hours.

EXAMPLES 7–9

Example 1 is repeated, substituting crystalline propylene-ethylene block copolymers I–III, described hereinbelow for the polypropylene thereof. The oven life of each of Examples 7–9 exceeds 500 hours and the $MI_b/MI_a$ of each is about 2.5.

[1] Epon 834, trademark of Shell Chemical Company for the foregoing condensation product of epichlorohydrin and 4,4'-isopropylidene-bis-phenol, having a viscosity at 25° C. of between 4.1 and 9.7 poises and an epoxide equivalent of from about 230 to 280 (grams of resin containing 1 gram equivalent of epoxide). The so-stabilized polymer had a $MI_a$ of 1.01, a $MI_b/MI_a$ of 1.5, a $MI_a$ color of 1, and a 280 F. oven life in excess of 760 hours.

PREPARATION OF BLOCK POLYMERS

(I)

Polymerization was carried out in accordance with the following procedure. A pressure reactor fitted with stirring means was flushed with nitrogen, and was partially filled with hexane. The catalyst, which consisted of aluminum diethyl chloride, titanium trichloride, and diethylene glycol dimethyl ether in a mol ration of 2:1:.03 was then added in an amount such that the hexane contained 0.035 gram of titanium trichloride per 100 cc. The contents of the reactor were then brought to a temperature of 162° F., hydrogen was added in an amount of of 16 parts per million by weight based on the weight of the hexane, and propylene was pressured in at 75 p.s.i.g. Polymerization of propylene commenced immediately, and was continued for 85 minutes, after which flow of pure propylene was discontinued, and a second feed, which consisted of 24% ethylene and 76% propylene, was pressured into the reactor. Polymerization was continued with this feed for 85 minutes, after which the reaction was killed by the addition of methanol. The reaction product was worked up, and a solid, highly crystalline block polymer was recovered. The total polymer contained 7.2% ethylene, as calculated from a material balance, and the solid block polymer, which amounted to 80% of the total polymer had a flow rate of 2.3, a brittle point of −13.5° C., as determined by ASTM D746–57T and a tensile impact strength as determined by ASTM 1822–61T or 94. Pure polypropylene of this flow rate has a brittle point of 14° C. and a tensile impact strength of 28.

(II)

A water jacketed polymerization reactor was charged with n-hexane, titanium trichloride, ethyl aluminum dichloride, and ethyl orthosilicate in quantities such that the hexane contained 0.07 gram of titanium trichloride per 100 cc. and the mol ratio of ethyl aluminum dichloride to titanium trichloride to ethyl orthosilicate was 2:1:0.65. The reactor contents were brought to 160° F. Hydrogen was added to the reactor in an amount of 16.5 parts per million by weight based on the weight of the hexane. The reactor was then pressured with 75 p.s.i.g. propylene partial pressure. The total pressure was 81 p.s.i.g., 6 p.s.i.g. being due to hydrogen and hexane partial pressures. Polymerization started immediately and was continued for 94 minutes while maintaining the pressure at 81 p.s.i.g. Flow of propylene was then discontinued, and a mixture of 20% ethylene and 80% propylene was introduced into the reactor at a pressure of 81 p.s.i.g. Polymerization was continued for 196 minutes with this feed stock, after which the reaction was stopped by the addition of methanol. By material balance, it was calculated that the total product recovered from the reactor, which was 83% insoluble in boiling pentane, contained 4.8% ethylene. The product, which had a flow rate of 2.4, was molded into test pieces, and the brittle point was determined by ASTM D746–57T, and tensile impact by ASTM D1822–61T. The brittle point was −4.5° C. and the tensile impact was 44. Polypropylene having a flow rate of 2.4 has a brittle point of 13° C. and a tensile impact of 28.

(III)

Copolymerization was carried out in accordance with the following procedure. A pressure reactor fitted with stirring means was flushed with nitrogen and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. of hexane. The contents of the reactor were then brought to a temperature of 160° F., hydrogen was added in an amount of 20 parts per million by weight based on the weight of the hexane, and a mixture of 3 mol percent ethylene and 97% propylene was pressured in at 75 p.s.i.g. Polymerization started immediately and was continued for 12 minutes, while maintaining the pressure constant by the addition of the mixture. This feed was then discontinued and a second feed consisting of ethylene alone was pressured into the reactor for 1 minute, after which flow of the first feed to the reactor was resumed. This was repeated several times, the entire polymerization cycle being as follows:

| Feed: | Time in minutes |
|---|---|
| 1st | 20 |
| 2nd | 8 |
| 1st | 27 |
| 2nd | 15 |
| 1st | 45 |
| 2nd | 19 |
| 1st | 56 |

The reaction was terminated by the addition of methanol, and a solid crystalline propylene-ethylene block copolymer having the following characteristics was recovered: percent ethylene in the total product=11.5, flow rate=1.8, brittle point=−9.0° C., Izod impact=1.3 ft. lbs./in., tensile impact=47.3 ft. lbs./in., yield tensile strength @ 1 in. per minute= 3500 p.s.i., tensile strength @ 1 in. per minute=4300 p.s.i., percent elongation @ 1 in. per minute=376, tensile modulus=106,000 and flexural modulus=120,000.

CONTROLS 2 THROUGH 59

Example 1 was repeated, substituting for the stabilizer thereof an additive, or mixture thereof, as set forth in the appended table. Controls 2 through 31 are phenolic materials disclosed, inter alia, in the prior art as rubber antioxidants, Controls 32 through 48 are metal compounds, phosphorus compounds and other materials disclosed, inter alia, in the prior art as stabilizers for polyvinyl chloride and the like. Controls 49 through 59 are mixtures of rubber antioxidants and polyvinyl chloride stabilizers.

| Control | | MIa | MIb/MIa | MIa color | 280° F. oven life (hours) |
|---|---|---|---|---|---|
| 2 | 0.50% bis phenol B [1] | 0.263 | 5.32 | 5 | 22 |
| 3 | 0.5% Norox "A" [2] | 0.069 | 2.75 | 4 | 155 |
| 4 | 0.5% 4,4′ methylene bis 6-t-butyl-o-cresol | 0.067 | 4.06 | 4 | 161 |
| 5 | 0.69% tri tert amyl phenol | 0.068 | 3.37 | 4 | 59 |
| 6 | 0.48% propyl gallate | 0.044 | 4.18 | 7 | 188 |
| 7 | 0.44% isopropylated-p-cresol | 0.084 | 4.72 | 1 | 59 |
| 8 | 0.5% tri isopropyl phenol | 0.095 | 6.65 | 1 | 59 |
| 9 | 0.56% isopropylated-p-sec amyl phenol | 0.099 | 4.17 | 1 | 59 |
| 10 | 0.59% isopropylated-p-cyclo hexyl phenol | 0.095 | 5.8 | 1 | 59 |
| 11 | 0.63% isopropylated-3-methyl-5 iso propyl phenol | 0.072 | 3.58 | 1 | 59 |
| 12 | 0.44% isopropylated p/m cresol | 0.114 | 4.05 | 1 | 59 |
| 13 | 0.37% isopropylated xylenol | 0.097 | 3.82 | 1 | 59 |
| 14 | 0.47% 2,4-di-t-butyl phenol | 0.061 | 3.95 | 1 | 83 |
| 15 | 0.33% 2,6-dimethyl phenol | 0.065 | 3.0 | 1 | 68 |
| 16 | 0.25% p-cresol | 0.200 | 4.2 | 1 | 41 |
| 17 | 0.25% cresol | 0.132 | 4.35 | 1 | 41 |
| 18 | 0.5% dinonyl phenol | 0.092 | 3.4 | 1 | 64 |
| 19 | 0.31% trimethyl phenol | 0.083 | 2.77 | 1 | 64 |
| 20 | 0.5% Nonox WSL [3] | 0.081 | 3.97 | 3 | 65 |
| 21 | 0.5% Nevastain A [3] | 0.085 | 3.18 | 4 | 188 |

Footnotes at end of table.

| Control | | MIa | MIb/MIa | MIa color | 280° F. oven life (hours) |
|---|---|---|---|---|---|
| 22 | 0.5% 2,6-di-t-butyl-4-methyl phenol | 0.054 | 3.4 | 4 | 70 |
| 23 | 0.5% 2,4,6,-tri-t-amyl phenol | 0.120 | 3.7 | 4 | 32 |
| 24 | 0.5% 4-propenyl pyrocatechol | 0.030 | 0.77 | 6 | <96 |
| 25 | 0.5% 2,2-thio-bis-(4,6-dichlorophenol) | 2.547 | 2.7 | 4 | 144 |
| 26 | 0.5% Naugatuck ESSU | 0.203 | 1.5 | 1 | 72 |
| 27 | 0.5% 2-dodecyl-4-methyl-6-t-butyl phenol | 0.363 | 1.8 | 10 | 96 |
| 28 | 0.5% n-butyl-p-hydroxy benzoate | 1.353 | 2.8 | 1 | 24 |
| 29 | 0.5% methyl salicylate | 0.523 | 3.9 | 1 | 24 |
| 30 | 0.5% 2,6-bis-(α-methyl-benzyl)-phenol | 0.687 | 1.9 | 1 | 84 |
| 31 | 0.5% 2,6-bis-(α,α-dimethylbenzyl)-phenol | 0.939 | 2.5 | | 24 |
| 32 | 0.5% pentaerythritol | 0.149 | 13.6 | 1 | 20 |
| 33 | 0.5% Epon 834 [6] | 0.101 | 5.36 | 1 | 66 |
| 34 | 0.5% Plastoflex EET [7] | 0.197 | 14.08 | 1 | 24 |
| 35 | 0.25% calcium stearate | 1.918 | 3.9 | 1 | 17 |
| 36 | 0.5% barium cadmium laurate | 0.092 | 3.2 | 1 | 46 |
| 37 | 0.5% Advastab CH-300 [8] | 0.140 | 3.4 | 2 | <24 |
| 38 | 0.5% Advastab 235-12 [8] | 0.965 | 3.0 | 2 | <24 |
| 39 | 0.5% Advastab 235-16 [8] | 0.141 | 3.1 | 2 | <24 |
| 40 | 0.5% Ba-Cd soap (Stayrite 70 [9]) | 0.084 | 3.8 | | 19 |
| 41 | 0.5% Thermolite 31[10] liquid organo tin sulfur compound | 0.115 | 5.0 | 1 | 88 |
| 42 | 0.25% tris-(2-chloroethyl)-phosphite | | | | <19 |
| 43 | 0.25% triphenyl phosphite | | | | <19 |
| 44 | 0.25% tris(octadecyl) phosphite | | | | 24 |
| 45 | 0.25% tris(nonyl phenyl) phosphite | | | | <22 |
| 46 | 0.25% guanylurea phosphate | | | | <19 |
| 47 | 0.25% tris(isopropyl) phosphite | | | | <22 |
| 48 | 0.25% alkylaryl phosphite | | | | <22 |
| 49 | 0.25% tris(nonyl phenyl) phosphite, 0.25% 2,6-ditertiary butyl-4-methyl phenol | | | | <22 |
| 50 | 0.25% alkyl aryl phosphite, 0.25% 2,6-di-t-butyl-4-methyl phenol | | | | <22 |
| 51 | 0.25% guanylurea phosphate, 0.25% 2,6-di-t-butyl-4-methyl phenol | | | | 19 |
| 52 | 0.25% tris (isopropyl phosphite), 0.25% 2,6-di-t-butyl-4-methyl phenol | | | | <22 |
| 53 | 0.25% 2,6-di-t-butyl-4-methyl phenol, 0.25% Ca oxide | 0.096 | 2.2 | 1 | 20 |
| 54 | 0.25% 2,6-di-t-butyl-4-methyl phenol, 0.5% trilauryl phosphite | 0.062 | 3.8 | 1 | 139 |
| 55 | 0.25% 2,6-di-t-butyl-4-methyl phenol, 0.5% diphenyl decyl phosphite | 0.215 | 3.3 | 1 | 44 |
| 56 | 0.25% 2,6-di-t-butyl-4-methyl phenol, 0.5% 2-ethyl hexyl phenyl ethyl phosphite | 0.071 | 2.1 | 1 | 67 |
| 57 | 0.25% 2,6-di-t-butyl-4-methyl phenol, 0.25% Ca stearate | 2.241 | 2.2 | 1 | 22 |
| 58 | 0.25% 2,6-di-t-butyl-4-lauryl phenol, 0.25% Ca stearate | 1.899 | 4.5 | 1 | 46 |
| 59 | 0.25% 2-T-butyl-6-lauryl-p-cresol, 0.25% Ca stearate | 2.98 | | 1 | 22 |

[1] Trademark of Dow Chemical Company for an antioxidant.
[2] Trademark of Harshaw Chemical Company for a phenolic antioxidant for polyvinyl chloride (probably a monophenol).
[3] Trademark of Harwick Standard Chemical Company for a phenolic antioxidant.
[4] Trademark of Neirlle Chemical Company for a liquid nonstaining rubber antioxidant (phenolic coumarone-indene resin).
[5] Trademark of U.S. Rubber Company for hindered phenol antioxidant.
[6] Trademark of Shell Chemical Company for a polymer having the formula:

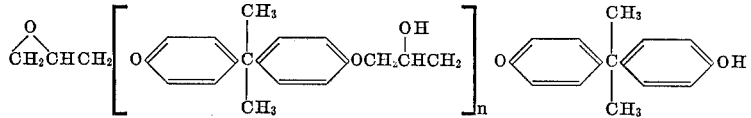

[7] Trademark of Advance Solvents and Chemical Corporation for a low molecular weight epoxy ester (butyl epoxy stearate).
[8] Trademark of Advance Solvents and Chemical Corporation for phosphorus-polycyclic antioxidant.
[9] Trademark of Witco for polyvinyl chloride stabilizer.
[10] Trademark of Metal and Thermit Corporation for polyvinyl chloride stabilizers.

These controls point up the unexpected nature of this invention. For example, whereas none of these additives, nor any of the combinations thereof, provides an oven life equaling 200 hours at 280° F., the tris-phenols of this invention provide an oven life at 280° F. in excess of 1100 hours (Example 1). Moreover, the results obtained in a number of these controls regarding oven life are not significantly better than non-stabilized polypropylene; compare, for example, Control 1 versus Controls 2, 28, 29, 31, 32, 34, 35, 37 through 40, 42 through 53, 57 and 59. Similarly whereas non-stabilized polypropylene (Control 1) and the compositions of this invention (Example 1) have excellent color, the color of the following controls is quite unacceptable for many uses: 2 through 6, 20 through 25 and 27. Furthermore, the processing stability ($MI_b/MI_a$) of the following controls is not acceptable: 2, 4, 6 through 10, 12, 16, 17, 32 through 34, 41 and 58; in fact the processing stability of Controls 32 and 34 is not as good as nonstabilized polypropylene.

The invention claimed is:
1. In a process for preparing polymeric compositions and shaped articles having improved resistance to factors causing environmental degradation wherein a solid, substantially crystalline polymer of propylene is mixed with a stabilizer, the resulting mixture is melted and formed into shaped articles; the improvement comprising mixing said polymer with from about 0.01% to about 5.0% by weight of a tris-phenol having the general formula:

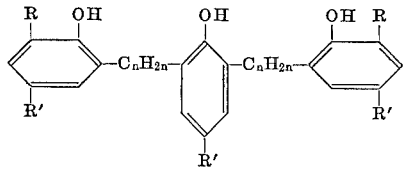

wherein $n$ is a whole number from 1 to 3, R is a tertiary alkyl group containing 4 to 8 carbon atoms, and R' is a normal alkyl group containing 1 to 8 carbon atoms, and thereby forming a composition having improved resistance to an increase in Melt Index when subjected to the combined effects of elevated temperature and mechanical shear.

2. The solid, substantially crystalline propylene polymer composition, having improved resistance to an increase in Melt Index resulting from subjecting said polymer to elevated temperature and mechanical shear, prepared in accordance with claim 1.

3. The composition of claim 2 wherein the quantity of said phenol is from about 0.05% to about 2% by weight of said composition.

4. In a process for preparing polymeric compositions and shaped articles having improved resistance to factors causing environmental degradation wherein a solid, substantially crystalline polymer of propylene is mixed with a stabilizer, the resulting mixture is melted and formed into shaped articles; the improvement comprising mixing said polymer with from about 0.05% to about 2.0% by weight of 2,6-bis-(2-hydroxyl-3-t-butyl-5-methyl-benzyl)-4-methyl-phenol, and thereby forming a composition having improved resistance to an increase in Melt Index when subjected to the combined effects of elevated temperature and mechanical shear.

5. The solid, substantially crystalline propylene polymer composition, having improved resistance to an increase in Melt Index resulting from subjecting said polymer to elevated temperature and mechanical shear, prepared in accordance with claim 4.

6. The process of claim 1 wherein said stabilizing quantity is from about 0.05% to about 2% by weight of said composition.

References Cited

UNITED STATES PATENTS

| | | | |
|---|---|---|---|
| 2,819,329 | 1/1958 | Sullivan et al. | 260—45.95 |
| 2,889,306 | 6/1959 | Hawkins et al. | 260—45.95 |
| 2,985,617 | 5/1961 | Salyer et al. | 260—45.95 |
| 3,013,003 | 12/1961 | Maragliano | 260—45.95 |
| 3,067,259 | 12/1962 | Bailey | 260—45,95 |

FOREIGN PATENTS

| | | | |
|---|---|---|---|
| 208,596 | 10/1951 | Australia | 260—45.95 |

OTHER REFERENCES

Modern Plastics Encyclopedia, September 1958, 704–707.

HOSEA E. TAYLOR, Primary Examiner

U.S. Cl. X.R.

260—23, 45.7, 45.75, 45.8, 45.85, 878

PO-1050
(5/69)

UNITED STATES PATENT OFFICE
CERTIFICATE OF CORRECTION

Patent No. 3,586,657                              Dated June 22, 1971

Inventor(s) John A. Casey

It is certified that error appears in the above-identified patent and that said Letters Patent are hereby corrected as shown below:

Column 1, line 27, "continuation-in-part" should be --continuation--.
Column 2, line 62, the letter "s" should be inserted before "tabilizing".
Column 3, line 31, the compound should be --2,6-bis-(2-hydroxy-3-tertiary-butyl-5-sec.butylbenzyl)-4-sec.butylphenol--. Column 6, line 2, "Poiypropylene" should be --Polypropylene--; lines 23 and 24, in last column of table headed "280°F. oven life (hours)", the numbers "2" and "8" should not be sublinear; line 51, the left-hand formula should be:

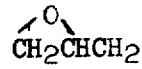

line 56, the right-hand formula should be: 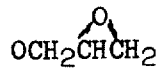

line 74, in the footnote, the degree sign was omitted from "280 F."
Column 7, line 9, "ration" should be --ratio--; line 30, "or" before "94" should be.--of--; column 7 and 8, in the table at bottom of page, opposite number "21", "0.5% Nevastain A³" should be --0.5% Nevastain A⁴--.
Columns 9 and 10, the compound opposite number "25" should be --0.5% 2,2'-thio-bis-(4,6-dichlorophenol)--; opposite number "26", "ESSU" should be --ESSU⁵--.

Signed and sealed this 16th day of November 1971.

(SEAL)
Attest:

EDWARD M. FLETCHER, JR.                    ROBERT GOTTSCHALK
Attesting Officer                          Acting Commissioner of Patents